(12) United States Patent
Jackson et al.

(10) Patent No.: US 6,730,401 B2
(45) Date of Patent: May 4, 2004

(54) MULTILAYERED PACKAGING MATERIALS FOR ELECTROSTATIC APPLICATIONS

(75) Inventors: William Carl Jackson, Kingsport, TN (US); Douglas Stephens McWilliams, Kingsport, TN (US)

(73) Assignee: Eastman Chemical Company, Kingsport, TN (US)

(*) Notice: Subject to any disclaimer, the term of this patent is extended or adjusted under 35 U.S.C. 154(b) by 0 days.

(21) Appl. No.: 09/901,882

(22) Filed: Jul. 9, 2001

(65) Prior Publication Data

US 2002/0176991 A1 Nov. 28, 2002

Related U.S. Application Data

(60) Provisional application No. 60/276,348, filed on Mar. 16, 2001.

(51) Int. Cl.⁷ .................. B32B 27/08; B32B 27/18; B32B 27/36; B32B 33/00; B65D 85/86
(52) U.S. Cl. .............. 428/411.1; 428/412; 428/423.1; 428/473.5; 428/474.4; 428/475.5; 428/480; 428/500; 428/521; 428/522; 428/523; 428/524; 428/532; 428/924; 206/719
(58) Field of Search .................. 206/709, 719, 206/720, 721; 252/500; 428/300.7, 411.1, 412, 423.1, 473.5, 480, 474.4, 500, 521, 522, 523, 524, 532, 924, 475.5

(56) References Cited

U.S. PATENT DOCUMENTS

| | | | |
|---|---|---|---|
| 4,061,827 A | * 12/1977 | Gould ................. | 219/553 |
| 4,154,344 A | 5/1979 | Yenni, Jr. et al. ....... | 206/524.6 |
| 4,168,229 A | * 9/1979 | Chambers ............ | 210/649 |
| 4,230,838 A | 10/1980 | Foy et al. ............. | 525/408 |
| 4,553,190 A | 11/1985 | Mueller .............. | 361/212 |
| 4,658,958 A | * 4/1987 | McNulty et al. ........ | 206/720 |
| 4,719,263 A | 1/1988 | Barnhouse et al. ...... | 525/187 |
| 4,931,506 A | 6/1990 | Yu .................. | 525/187 |
| 5,093,036 A | 3/1992 | Shafe et al. .......... | 252/511 |
| 5,101,139 A | 3/1992 | Lechter .............. | 315/85 |
| 5,110,669 A | 5/1992 | Knobel et al. ......... | 428/215 |
| 5,159,053 A | 10/1992 | Kolycheck et al. ...... | 528/76 |
| 5,237,009 A | 8/1993 | Lee ................. | 525/187 |
| 5,250,228 A | 10/1993 | Baigrie et al. ......... | 252/511 |
| 5,298,558 A | 3/1994 | Sullivan et al. ........ | 525/66 |
| 5,312,686 A | * 5/1994 | MacDiarmid et al. .... | 252/500 |
| 5,342,889 A | 8/1994 | Sullivan et al. ........ | 525/127 |
| 5,354,950 A | 10/1994 | Golane ............... | 174/35 MS |
| 5,382,384 A | 1/1995 | Baigrie et al. ......... | 252/511 |
| 5,476,612 A | 12/1995 | Wessling et al. ....... | 252/511 |
| 5,567,355 A | 10/1996 | Wessling et al. ....... | 252/500 |
| 5,574,104 A | 11/1996 | Kolycheck et al. ...... | 525/130 |
| 5,604,284 A | 2/1997 | Ueda et al. .......... | 524/434 |
| 5,643,990 A | 7/1997 | Uehara et al. ......... | 524/496 |
| 5,643,991 A | 7/1997 | Stipe et al. .......... | 524/496 |
| 5,886,098 A | 3/1999 | Ueda et al. .......... | 525/66 |
| 5,914,191 A | 6/1999 | Hanson et al. ........ | 428/409 |
| 6,184,280 B1 | 2/2001 | Shibuta .............. | 524/405 |
| 6,281,433 B1 | 8/2001 | Decker et al. ........ | 174/35 R |

FOREIGN PATENT DOCUMENTS

WO  WO 91/10237 A1  8/1991

OTHER PUBLICATIONS

"Electrically Conductive Polymer Composites and Blends." Polymer Engineering and Science, 32(1), 36 (1992), Jan. 1992.
"Processable Intrinsically Conductive Polymer Blends," Journal of Vinyl Technology, 14, 123 (1992), Jun. 1992.

* cited by examiner

Primary Examiner—Ramsey Zacharia
(74) Attorney, Agent, or Firm—B. J. Boshears; Bernard J. Graves

(57) ABSTRACT

A multi-layer structure comprises at least one electrostatic dissipative outer layer and a conductive core layer. The outer layer comprises a material selected from the group consisting of an inherently dissipative polymer, an inherently dissipative polymer blended with a non-conductive matrix polymer, an inherently conductive polymer blended with a non-conductive matrix polymer in an amount sufficient to impart a surface resistivity of greater than $10^5$ and less than $10^{12}$ ohms/square, and mixtures thereof. The core layer comprises a material selected from the group consisting of an inherently conductive polymer, an inherently conductive polymer blended with a non-conductive matrix polymer, a conductive filler blended with a non-conductive matrix polymer, and mixtures thereof. The multi-layer structure has unexpected improved electrical properties over prior art structures because the surface resistivity of the outer layer in the multi-layer structure is less than the surface resistivity of the outer layer alone or in another multi-layer structure absent contact with the core layer.

20 Claims, No Drawings ic> polyesters are not used because their melting points are too
MULTILAYERED PACKAGING MATERIALS FOR ELECTROSTATIC APPLICATIONS

FIELD OF THE INVENTION

This invention relates to multi-layer films or sheets and, more particularly, to those that are used to package static sensitive electronic components and claims benefit of U.S. Provisional Application Serial No. 60/276,348 filed Mar. 16, 2001.

BACKGROUND OF THE INVENTION

Polyester materials are widely used as extrusion and injection molding resins for applications such as fibers, films, automotive parts, and food and beverage containers. Commonly used polyesters include poly(ethylene terephthalate) (PET), poly(1,4-butylene terephthalate) (PBT), poly(1,4-cyclohexylene-dimethylene terephthalate) (PCT), and poly(ethylene 2,6-naphthalenedicarboxylate) (PEN). These polyesters typically have good heat resistance and high glass transition temperatures. For those applications in which extrusion and molding temperatures must be maintained below about 240° C., these highly crystallizable polyesters are not used because their melting points are too high. In such cases, amorphous or slowly crystallizable copolyesters are used since these materials may be processed at moderate temperatures.

For applications of packaging of static sensitive electronic components such as disk drive heads and integrated circuits, materials that are conductive or static dissipative and processable at moderate temperatures are required. The optimum fitness-for-use criteria for this market include electrostatic dissipation properties, dimensional stability, washability, thermoformability, acceptable slitting characteristics, peelable seal characteristics to cover tapes, and low migration levels of condensable materials from the package to the packaged components. Thermoplastics used for packaging of static sensitive electronic components often consist of blends of non-conductive polymers with inherently dissipative polymers (IDP), inherently conductive polymers (ICP), or conductive fillers. Blends containing IDPs have surface resistivities greater than $10^5$ and less than $10^{12}$ ohms/square. Blends containing ICPs or conductive fillers have surface resistivities less than $10^5$ ohms/square. While blends utilizing IDP have been preferred, industry trends are toward lower surface and volume resistivities and faster static decay times than provided by IDP blends.

Many patents disclose IDPs and their use as electrostatic dissipating additives for other non-conductive polymers. IDPs based on polyurethane copolymers derived from polyethylene glycol are disclosed in U.S. Pat. Nos. 5,159,053, 5,342,889 and 5,574,104. Such polyurethane copolymers are commercially available from The B. F. Goodrich Company under the tradename Stat-Rite™ and may be blended with other polymers as an electrostatic dissipative agent. Ethylene oxide copolymers used to impart electrostatic dissipating properties to various polymers are disclosed in U.S. Pat. Nos. 4,719,263, 4,931,506, 5,101,139 and 5,237,009. Polyetheresteramide electrostatic dissipating polymers are disclosed in U.S. Pat. Nos. 4,230,838 and 5,604,284, and blends of polyetheresteramide copolymers with other polymers are disclosed in U.S. Pat. Nos. 5,298,558 and 5,886,098. Another source disclosing blends of IDPs with non-conductive matrix polymers is "Electrically Conductive Polymer Composites and Blends," Polymer Engineering and Science, 32(1), 36 (1992).

As for ICPs blended with non-conductive polymers, WO 91/10237 discloses compositions with electrostatic dissipating properties that contain a non-conductive matrix polymer and at least two additives. In one of the examples, a copolyester of poly(ethylene terephthalate) containing 1,4-cyclohexanedimethanol is combined with polyaniline and another conductive material. The use of polyaniline in imparting electrical conductivity to various polymers including thermoplastic polyesters is also disclosed in U.S. Pat. No. 5,567,355. Another source disclosing blends of inherently conductive polymers and non-conductive matrix polymers for electrostatic dissipating applications is "Processable Intrinsically Conductive Polymer Blends," Journal of Vinyl Technology, 14, 123 (1992). ICPs alone are disadvantaged in the market place due to outgassing or release of volatiles.

Several references disclose the blending of conductive fillers with non-conductive polymers. U.S. Pat. Nos. 5,643,990 and 6,184,280 disclose the use of carbon fibrils in imparting electrical conductivity to various polymers including thermoplastic polyesters. A commercial product under the tradename Shock Block™, available from Hyperion Catalysis Int'l. of Cambridge, Mass., utilizes a highly-conductive, hollow, graphite fiber to impart conductivity to plastics. Shock Block™ is a mono-layer sheet that is static dissipative on the side in contact with the electronic part and conductive on the other side. Carbon black is another conductive filler used in imparting electrical conductivity to various polymers including thermoplastic polyesters as disclosed in U.S. Pat. Nos. 5,382,384, 5,250,228, and 5,093,036. The use of carbon black and impact modifiers in imparting electrical conductivity and mechanical toughness to amorphous copolyester resins is disclosed in U.S. Pat. No. 5,643,991. Due to the physical nature of conductive fillers, problems often arise with particle contamination even when blended with a polymer.

Multi-layer electrostatic dissipative structures are disclosed in U.S. Pat. No. 5,914,191. The outer layer(s) are comprised of a blend of copolyester and electrostatic dissipating polymer and the core layer is comprised of a polymer having a haze value less than 5 percent.

SUMMARY OF THE INVENTION

A multi-layer structure comprises at least one electrostatic dissipative outer layer and a conductive core layer. The outer layer comprises a material selected from the group consisting of an inherently dissipative polymer, an inherently dissipative polymer blended with a non-conductive matrix polymer, an inherently conductive polymer blended with a non-conductive matrix polymer in an amount sufficient to impart a surface resistivity of greater than $10^5$ and less than $10^{12}$ ohms/square, and mixtures thereof. The core layer comprises a material selected from the group consisting of an inherently conductive polymer, an inherently conductive polymer blended with a non-conductive matrix polymer, a conductive filler blended with a non-conductive matrix polymer, and mixtures thereof. The multi-layer structure has unexpected improved electrical properties over prior art structures because the surface resistivity of the outer layer in the multi-layer structure is less than the surface resistivity of the outer layer alone or in another multi-layer structure absent contact with the core layer.

DESCRIPTION OF THE INVENTION

This invention relates to a new class of thermoformable multi-layer structures for applications requiring a thermoplastic material that can dissipate an electrostatic charge. Many applications exist in which the multi-layer structure of the present invention may be used, i.e. packaging for static sensitive electronic components, clean room glazing and multi-wall sheets used as partitions, fabricated boxes and extruded profiles.

The multi-layer structure of the present invention has unexpected improved electrical properties over prior art structures utilized for the same applications. The surface resistivity of the outer layer in the multi-layer structure is less than the surface resistivity of the outer layer alone or in another multi-layer structure absent contact with the core layer. This lowering of the surface resistivity of the outer layer is caused by contact with the conductive core layer. This phenomenon is shown in the Examples below. Additionally, the multi-layer structures exhibit lower volume resistivities and faster static decay times than monolayer electrostatic dissipative structures. The multi-layer structures also provide lower particulate contamination or sloughing compared to monolayer structures utilizing conductive fillers.

The multi-layer structure comprises at least one electrostatic dissipative outer layer and a conductive core layer. Preferably, two outer layers are utilized with the core layer sandwiched therebetween. The outer layer is a dissipative layer having surface resistivity of about $10^5$ to about $10^{12}$ ohms/square. The outer layer comprises a material selected from the group consisting of an inherently dissipative polymer, an inherently dissipative polymer blended with a non-conductive matrix polymer, an inherently conductive polymer blended with a non-conductive matrix polymer in an amount sufficient to impart a surface resistivity of greater than $10^5$ and less than $10^{12}$ ohms/square, or mixtures thereof. The core layer is a conductive layer having a surface resistivity less than $10^5$ ohms/square or a volume resistivity less than $10^7$ ohms-cm. The core layer comprises a material selected from the group consisting of an inherently conductive polymer, an inherently conductive polymer blended with a non-conductive matrix polymer, a conductive filler blended with a non-conductive matrix polymer, and mixtures thereof. The multi-layer structure may additionally have tie layers between the core layer and each of the outer layers.

The multi-layer electrostatic dissipative structures comprise at least one outer layer and a core layer. The preferred multi-layer structures comprise three to five layers. The three-layer structure comprises two outer layers with the core layer sandwiched therebetween. The five-layer structure in addition has two tie layers, one each between the core layer and each of the outer layers. Additional layers may also be added to the structure depending on the needs of the particular application.

The outer layer of the multi-layer structure is an electrostatically dissipative material and can be (i) an inherently dissipative polymer, (ii) an inherently dissipative polymer blended with a non-conductive matrix polymer, (iii) an inherently conductive polymer blended with a non-conductive matrix polymer in an amount sufficient to impart a surface resistivity of greater than $10^5$ and less than $10^{12}$ ohms/square, or (iv) mixtures thereof. Preferably, the IDP or ICP is blended with amorphous or semi-crystalline polymers as set forth below. The outer layers contain an amount of IDP or ICP sufficient to impart a surface resistivity of about $10^5$ to about $10^{12}$ ohms/square, preferably $10^7$ to $10^{10}$ ohms/square, before and after thermoforming. The surface resistivity is measured according to ASTM D 257-92.

Preferably, the inherently dissipative polymer of the outer layer is a polyetherurethane, a polyetheresteramide, or a polyetherester and present in the blend in an amount of about 3 to about 40 weight percent, based on the total weight of the blend. The preferred amount of the IDP is about 25 to about 35 weight percent. Preferably, the inherently conductive polymer of the outer layer is a polyaniline and is present in the blend in an amount of about 3 to about 15 weight percent. For the outer layer only, the ICP is blended with the non-conductive matrix polymer such that the blend is dissipative rather than conductive, thus the amount of ICP present should be an amount sufficient to impart a surface resistivity of greater than $10^5$ and less than $10^{12}$ ohms/square. Examples of IDPs are Stat-Rite™ available from The B. F. Goodrich Company; Pebax® available from Atofina; Irgastat® available from Ciba Specialty Chemicals; Pelestat available from Sanyo Chemical Industries, Ltd. Examples of ICPs are Ormecon™ available from Zipperling Kessler and Company; and Panipol® available from Panipol Ltd.

The core layer of the multi-layer structure is a conductive material and can be (i) an inherently conductive polymer, (ii) an inherently conductive polymer blended with a non-conductive matrix polymer, (iii) a conductive filler blended with a non-conductive matrix polymer, and (iv) mixtures thereof. Preferably, the ICP or conductive filler is blended with an amorphous or semi-crystalline polymer as set forth below. The core layer contains an amount of ICP or conductive filler in sufficient amount to impart a surface resistivity less than $10^5$ ohms/square or a volume resistivity less than $10^7$ ohm-cm. Exemplary conductive fillers include carbon black powders, carbon fibers, metal powders, metal fibers, metal oxides. Conductive fillers are preferably present in the amount of about 0.5 to about 40 weight percent, based on the total weight of the blend. The preferred amount of conductive powder such as conductive carbon black powder or metal powder is about 5 to about 20 weight percent. Examples of conductive carbon black powders include Vulcan® XC72, Vulcan® P, and Black Pearls® available from Cabot Corporation and Ketjenblack EC available from Akzo Nobel. The preferred amount of conductive fiber is about 3 to about 15 weight percent. Examples of conductive fibers include Graphite Fibrils™ available from Hyperion Catalysis International and Beki-shield® available from Bekaert Fiber Technologies. A preferred ICP is polyaniline and is present in the blend in an amount of about 3 to about 15 weight percent. Examples of polyaniline are Ormecon™ available from Zipperling Kessler and Company, and Panipol® available from Panipol Ltd.

The matrix polymers of both the outer layer and the core layer can be any number of polymers that are compatible with the IDPs, ICPs, or conductive fillers. Representative examples of matrix polymers include a polyester such as poly(butylene terephthalate), poly(ethylene terephthalate), poly(ethylene naphthalenedicarboxylate), poly(ethylene 1,4-cyclohexanedicarboxylate) or a copolyester thereof; a polyvinyl chloride or a copolymer thereof; a chlorinated polyvinyl chloride; a copolymer of styrene and acrylonitrile; a terpolymer of styrene, acrylonitrile, and diene rubber such as acrylonitrile-butadiene-styrene and such terpolymer modified with an acrylate elastomer such as acrylonitrile-butadiene-methylmethacrylate-styrene; a copolymer of styrene and acrylonitrile modified with an acrylate elastomer such as acrylonitrile-n-butylacrylate-styrene; a copolymer of styrene and diene rubber modified with an acrylate elastomer such as methylmethacrylate-butadiene-styrene; a copolymer of styrene and acrylonitrile modified with ethylene propylene diene monomer rubber (such as acrylonitrile-ethylene/propylene-styrene; a polystyrene; a rubber modified polystyrene; a polyolefin such as a polyethylene or polypropylene; a nylon; a polycarbonate; a cellulose ester; a polyetherester block copolymer; a polyurethane; a polyphenylene oxide; a polyacetal; a polyamide; a polyacrylonitrile; a polyphenylene oxide; a polyketone; a polysulphone; a polyimide; a polybenzimidazole; a polyamide elastomer; and a polymethylmethacrylate.

Preferably, the non-conductive matrix polymer is an amorphous or semi-crystalline polymer. As the major component of the blend, the matrix polymer provides the necessary mechanical properties desired for the blend. Even more preferred as the matrix polymer is a copolyester of poly(ethylene terephthalate) that contain a sufficient amount of residues of a dibasic acid monomer or a glycol monomer to have a melting point of less than 240° C. Useful dibasic acid monomers include aliphatic dibasic acids containing about 4 to about 40 carbon atoms; cycloaliphatic dibasic acids such as 1,4-cyclohexanedicarboxylic acid; and aromatic acids such as naphthalenedicarboxylic acid and isophthalic acid. Useful glycol monomers include those containing about 3 to about 15 carbon atoms such as propylene glycol, 1,3-propanediol, 1,4-butanediol, 1,6-hexanediol, 1,4-cyclohexanedimethanol, neopentyl glycol, and 2,2,4,4-tetramethyl-1,3-cyclobutanediol. Copolyesters of poly (ethylene 2,6-naphthalenedicarboxylate) (PEN copolyesters) or poly(ethylene 1,4-cyclohexanedicarboxylate) (PECD copolyesters) are also useful. The most preferred matrix polymer is a copolyester of poly(ethylene terephthalate) modified with 1,4-cyclohexanedimethanol. The inherent viscosity (I.V.) of these copolyesters is generally in the range of about 0.5 to about 1.5 dL/G as measured at 25° C. in a solvent mixture consisting of 60 percent by weight phenol and 40 percent by weight tetrachloroethane.

The outer layer and the core layer can comprise other polymeric materials besides the matrix polymer. Additional polymers included may be impact modifiers to improve the mechanical properties of polymers, especially those that are highly loaded with fillers as in the core layer. Compatibilizers may be added to enhance the properties of the blends. Other materials may also be added such as stabilizers, colorants, flame retardants, and reinforcing agents. Regrind from previous extrusion or thermoforming operations may be added. The matrix polymer can also be blended with one or more other polymeric materials along with the ICP or IDP.

There are a number of commercially available blends comprising amorphous or semi-crystalline matrix polymers and IDPs or ICPs. Examples are products available under the tradenames EastaStat™ from Eastman Chemical Company, Stat-Rite® from The B. F. Goodrich Company, PermaStat® from RTP Corporation, and Stat-Loy® from LNP Engineering Plastics, Inc.

The tie layers serve as a compatibilizer to improve adhesion between the outer layer and core layer. The tie layers are preferably static dissipative or conductive. More preferably, the tie layers possess a surface resistivity less than $10^{12}$ ohms/square. Static dissipative or conductive tie layers can be produced from commercially available tie layers by the addition of static dissipative agents or conductive fillers.

In the multi-layer structures, the overall thickness of the multi-layer structure is about 0.2 mm to about 6 mm (about 8 to about 250 mils), preferably 0.2 mm to 1.25 mm (8 to 50 mils) for packaging applications. The thickness of the outer layers is about 0.0125 mm to about 0.5 mm (about 0.5 to about 20 mils), preferably 0.0125 mm to 0.25 mm (0.5 to 10 mils) for packaging applications. Tie layers will have a thickness of about 0.0125 mm to 0.25 mm (about 0.5 to 10 mils), preferably 0.025 mm to 0.125 mm (1 to 5 mils).

The multi-layer structures are made using conventional laminating techniques such as coextrusion, in-line or off-line lamination and extrusion coating. When converting the multi-layer structures into end products via thermoforming, draw ratios of about 1.1:1 to about 4:1 are used and temperatures of about 120° C. to about 180° C. are used.

This invention can be further illustrated by the following examples of preferred embodiments thereof, although it will be understood that these examples are included merely for purposes of illustration and are not intended to limit the scope of the invention unless otherwise specifically indicated. In the examples, the following is to be noted.

Eastar® PETG 6763 is a copolyester based on terephthalic acid, ethylene glycol, and 1,4-cyclohexanedimethanol produced and sold by the Eastman Chemical Company.

EastaStat™ GSP12 is a static dissipative polymer blend comprising Eastar® PETG 6763, an inherently dissipative polymer, and a polymeric compatibilizer produced and sold by the Eastman Chemical Company.

EastaStat™ GSP32 is a conductive polymer blend comprising Eastar® PETG 6763, a conductive carbon black filler, and an impact modifier produced and sold by the Eastman Chemical Company.

Surface and volume resistivities were measured according to the ASTM D 257-92 standard test method entitled "Standard Test Methods for D-C Resistance or Conductance of Insulating Materials." The values reported represent the average of six measurements.

Static decay time was measured using a charge plate monitor similar to the method outlined in "Decay-Time Characterization of ESD Materials for Use with Magnetoresistive Recording Heads," EOS/ESD Symposium Proceedings 19, 373 (1997). The test procedure consisted of placing a film sample on the plate and charging the sample to approximately 1100 V. The sample was then grounded and the charge monitored versus time. The decay time was defined as the time required for the charge to dissipate from 1-000 V to 100 V or from 1000 V to 15 V. The values reported represent the average of six measurements.

EXAMPLES 1–3

Monolayer Film Properties

For subsequent comparison to multi-layer films below, monolayer films of Eastar® PETG 6763 Copolyester, EastaStat™ GSP12, and EastaStat™ GSP32 were produced by cast film extrusion. The thickness of each film was 0.030 inches. The surface resistivity, volume resistivity, and static decay times are provided in Table 1. According to the definitions in EIA-541, Eastar® PETG 6763 is characterized as insulative, EastaStat™ GSP12 is dissipative, and EastaStat™ GSP32 is conductive. Eastar® PETG 6763 is a copolyester of PET modified with 1,4-cyclohexanedimethanol (PETG). EastaStat™ GSP12 contains a non-conductive matrix polymer of PETG and an IDP. EastaStat™ GSP32 contains a non-conductive matrix polymer of PETG and a conductive filler.

TABLE 1

| Ex. No. | Material | Rs (ohms/sq.) | Rv (ohm-cm) | 1000–100 V Decay Time (s) | 1000–15 V Decay Time (s) |
|---|---|---|---|---|---|
| 1 | Eastar ® PETG 6763 | $2.9 \times 10^{14}$ | $3.0 \times 10^{16}$ | >60 | >60 |
| 2 | EastaStat ™ GSP12 | $5.5 \times 10^{9}$ | $2.6 \times 10^{11}$ | 0.21 | 0.42 |
| 3 | EastaStat ™ GSP32 | $3.6 \times 10^{4}$ | $2.8 \times 10^{6}$ | 0.10 | 0.15 |

EXAMPLES 4–6

Coextrusions of Static Dissipative Cap Layers on a

Three layer coextruded film structures were produced using a center layer of EastaStat™ GSP32 (i.e. PETG blended with conductive filler) and two outer layers of EastaStat™ GSP12 (i.e. PETG blended with IDP). The total thickness of the film was 0.030 inches. The surface resistivity, volume resistivity, and static decay times are provided in Table 2. The surface and volume resistivities and static decay times are lower for the multi-layer films compared to the monolayer static dissipative film of Example 2. The percent improvements (% I) in Table 2 below are relative to Example 2. Thus, improved electrostatic dissipation properties, i.e. lower resistivities and reduced static decay times, are realized by coextruding the static dissipative blend onto a conductive core layer.

TABLE 2

| Ex No | A/B/A (mils) | Rs (ohms per sq.) | % I | Rv (ohm-cm) | % I | 1000–100 V Decay Time (sec) | % I | 1000–15 V Decay Time (sec) | % I |
|---|---|---|---|---|---|---|---|---|---|
| 4 | 3/24/3 | $1.4 \times 10^9$ | −75.6 | $4.2 \times 10^{10}$ | −83.9 | 0.14 | −33.3 | 0.28 | −33.3 |
| 5 | 1.5/27/1.5 | $1.3 \times 10^9$ | −76.4 | $5.2 \times 10^{10}$ | −80.0 | 0.12 | −42.9 | 0.23 | −45.2 |
| 6 | 1/28/1 | $5.2 \times 10^8$ | −90.6 | $1.5 \times 10^{10}$ | −94.2 | 0.09 | −57.1 | 0.16 | −61.9 |

EXAMPLES 7–9

Coextrusions of Insulative Cap Layers on a Conductive Core Layer

Three layer coextruded film structures were produced using a center layer of EastaStat™ GSP32 (conductive material) and two outer layers of Eastar® PETG 6763 (insulative material). The total thickness of the film was 0.030 inches. The surface resistivity, volume resistivity, and static decay times are provided in Table 3. The surface resistivities are slightly lower for the multi-layer films compared to the monolayer film of Example 1; however, there is no reduction in volume resistivity or static decay time. Thus, improved electrostatic dissipation properties are not realized by coextruding an insulative material onto a conductive core layer.

TABLE 3

| Ex. No. | A/B/A (mils) | Rs (ohms/sq.) | Rv (ohm-cm) | 1000–100 V Decay Time (s) | 1000–15 V Decay Time (s) |
|---|---|---|---|---|---|
| 7 | 3/24/3 | $1.6 \times 10^{14}$ | $3.0 \times 10^{16}$ | >60 | >60 |
| 8 | 1.5/27/1.5 | $1.6 \times 10^{14}$ | $3.0 \times 10^{16}$ | >60 | >60 |
| 9 | 1/28/1 | $2.7 \times 10^{13}$ | $5.9 \times 10^{15}$ | >60 | >60 |

EXAMPLE 10

Coextrusions of Static Dissipative Cap Layers on an Insulative Core Layer

A three layer coextruded film structure was produced using a center layer of Eastar® PETG 6763 (an insulative material) and two outer layers of EastaStat™ GSP12 (dissipative material). The total thickness of the film was 0.030 inches. The surface and volume resistivities were $9.8 \times 10^9$ ohms/square and $9.8 \times 10^{14}$ ohm-cm respectively. The static decay times from 1000 to 100 V and 1000 to 15 V were 0.28 and greater than 60 seconds respectively. The surface and volume resistivities and static decay times are greater for the multi-layer films compared to monolayer film of Example 2. Thus, improved electrostatic dissipation properties are not realized by coextruding a static dissipative material onto an insulative core layer.

What is claimed is:

1. A multi-layer structure comprising at least one electrostatic dissipative outer layer and a conductive core layer, wherein
   (a) said outer layer comprises an inherently dissipative polymer blended with a non-conductive matrix polymer; and
   (b) said core layer comprises a material selected from the group consisting of (i) an inherently conductive polymer blended with a non-conductive matrix polymer and (ii) a conductive filler blended with a non-conductive matrix polymer,
whereby said outer layer of said multi-layer structure has a surface resistivity of less than a surface resistivity of said outer layer absent contact with said core layer.

2. The multi-layer structure of claim 1 further comprising a second outer layer with said core layer sandwiched between said outer layers.

3. The multi-layer structure of claim 2 further comprising two tie layers with each one of said tie layers between said core layer and each of said outer layers.

4. The multi-layer structure of claim 1 further comprising a tie layer between said core layer and said outer layer.

5. The multi-layer structure of claim 1 wherein said inherently dissipative polymer of said outer layer is selected from the group consisting of polyetherurethane, polyetheresteramide, and polyether ester.

6. The multi-layer structure of claim 1 wherein said outer layer is a blend of about 3 to about 40 weight percent, based on the total weight of the blend, of an inherently dissipative polymer of said outer layer with said non-conductive matrix polymer.

7. The multi-layer structure of claim 1 wherein said outer layer is a blend of about 25 to about 35 weight percent, based on the total weight of the blend, of an inherently dissipative polymer with said non-conductive matrix polymer.

8. The multi-layer structure of claim 1 wherein said non-conductive matrix polymer of the outer layer and the core layer is selected from the group consisting of a polyester or copolyester thereof; a polyvinyl chloride or copolymer thereof; a chlorinated polyvinyl chloride; a copolymer of styrene and acrylonitrile; a terpolymer of styrene, acrylonitrile, and diene rubber; a copolymer of styrene and acrylonitrile modified with an acrylate elastomer; a copolymer of styrene and diene rubber modified with an acrylate elastomer; a copolymer of styrene and acrylonitrile modified with ethylene propylene diene monomer rubber; a polystyrene; a rubber modified polystyrene; a polyolefin; a nylon; a polycarbonate; a cellulose ester; a polyetherester block copolymer; a polyurethane; a polyphenylene oxide; a polyacetal; a polyamide; a polyacrylonitrile; a polyketone; a polysulphone; a polyimide; a polybenzimidazole; a polyamide elastomer; and a polymethylmethacrylate.

9. The multi-layer structure of claim 1 wherein said inherently conductive polymer of said core layer is a polyaniline.

10. The multi-layer structure of claim 1 wherein said inherently conductive polymer of said core layer is blended with said non-conductive matrix polymer in an amount from about 3 to about 15 weight percent.

11. The multi-layer structure of claim 1 wherein said conductive filler of said core layer is selected from the group consisting of a carbon black powder, a carbon fiber, a metal powder, a metal fiber, and a metal oxide.

12. The multi-layer structure of claim 1 wherein said conductive filler of said core layer is blended with said non-conductive matrix polymer in an amount from about 0.5 to about 40 weight percent.

13. The multi-layer structure of claim 1 wherein said conductive filler of said core layer is a powder and is blended with said non-conductive matrix polymer in an amount from about 5 to about 20 weight percent.

14. The multi-layer structure of claim 1 wherein said conductive filler of said core layer is a fiber and is blended with said non-conductive matrix polymer in an amount from about 3 to about 15 weight percent.

15. The multi-layer structure of claim 1 wherein said non-conductive matrix polymer of said core layer is a polyester selected from the group consisting of poly(butylene terephthalate), poly(ethylene terephthalate), poly(ethylene naphthalenedicarboxylate), poly(ethylene 1,4-cyclohexanedicarboxylate) and a copolyester thereof.

16. The multi-layer structure of claim 1 wherein said non-conductive matrix polymer of said core layer is a copolyester of poly(ethylene terephthalate) containing a sufficient amount of residues of a dibasic acid monomer or glycol monomer to have a melting point of less than 240° C.

17. The multi-layer structure of claim 1 wherein said non-conductive matrix polymer of said core layer is a copolyester of poly(ethylene terephthalate) modified with 1,4-cyclohexanedimethanol.

18. A multi-layer structure comprising at least one electrostatic dissipative outer layer and a conductive core layer wherein
  (a) said outer layer is a blend of about 3 to about 40 weight percent, based on the total weight of the blend, of an inherently dissipative polymer with a non-conductive matrix polyester polymer of said outer layer is a polyester selected from the group consisting of poly(butylene terephthalate), poly(ethylene terephthalate), poly(ethylene naphthalenedicarboxylate), poly(ethylene 1,4-cyclohexanedicarboxylate) and a copolyester thereof; and
  (b) said core layer comprises a material selected from the group consisting of (i) an inherently conductive polymer blended with a non-conductive matrix polymer and (ii) a conductive filler blended with a non-conductive matrix polymer;
whereby said outer layer of said multi-layer structure has a surface resistivity of less than a surface resistivity of said outer layer absent contact with said core layer.

19. The multi-layer structure of claim 18 comprising at least one electrostatic dissipative outer layer and a conductive core layer wherein said outer layer is a blend of about 3 to about 40 weight percent, based on the total weight of the blend, of an inherently dissipative polymer selected from the group consisting of polyetherurethane, polyatheresteramide, and polyether ester with a non-conductive matrix polymer comprising a copolyester of poly(ethylene terephthalate) containing a sufficient amount of residues of a dibasic acid monomer or glycol monomer to have a melting point of less than 240° C.

20. The multi-layer structure of claim 19 wherein said outer layer is a blend of about 25 to about 35 weight percent, based on the total weight of the blend, of an inherently dissipative polymer selected from the group consisting of polyetherurethane, polyetheresteramide, and polyether ester with a non-conductive matrix polymer comprising a copolyester of poly(ethylene terephthalate) modified with 1,4-cyclohexanedimethanol.

* * * * *